Patented July 23, 1946

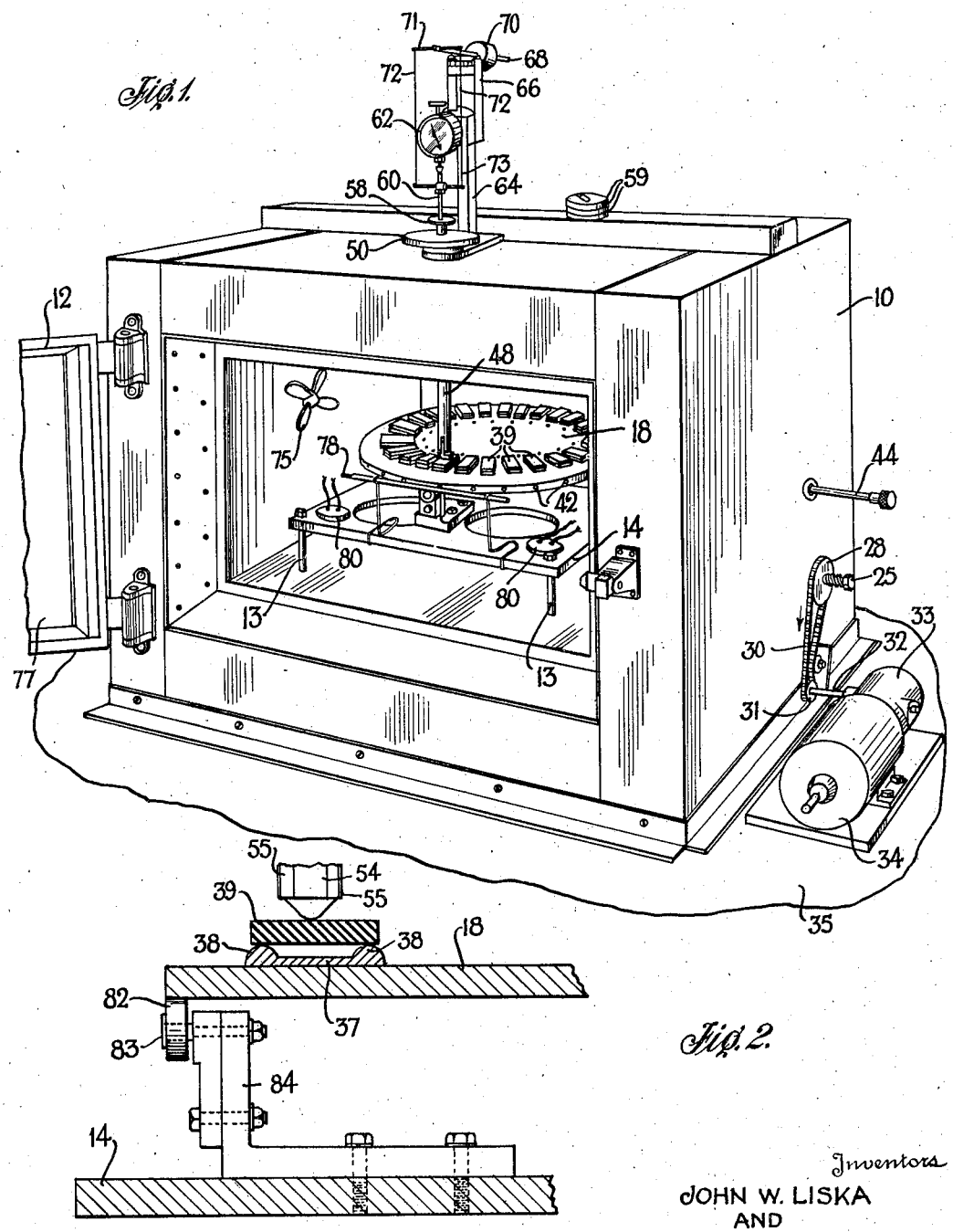

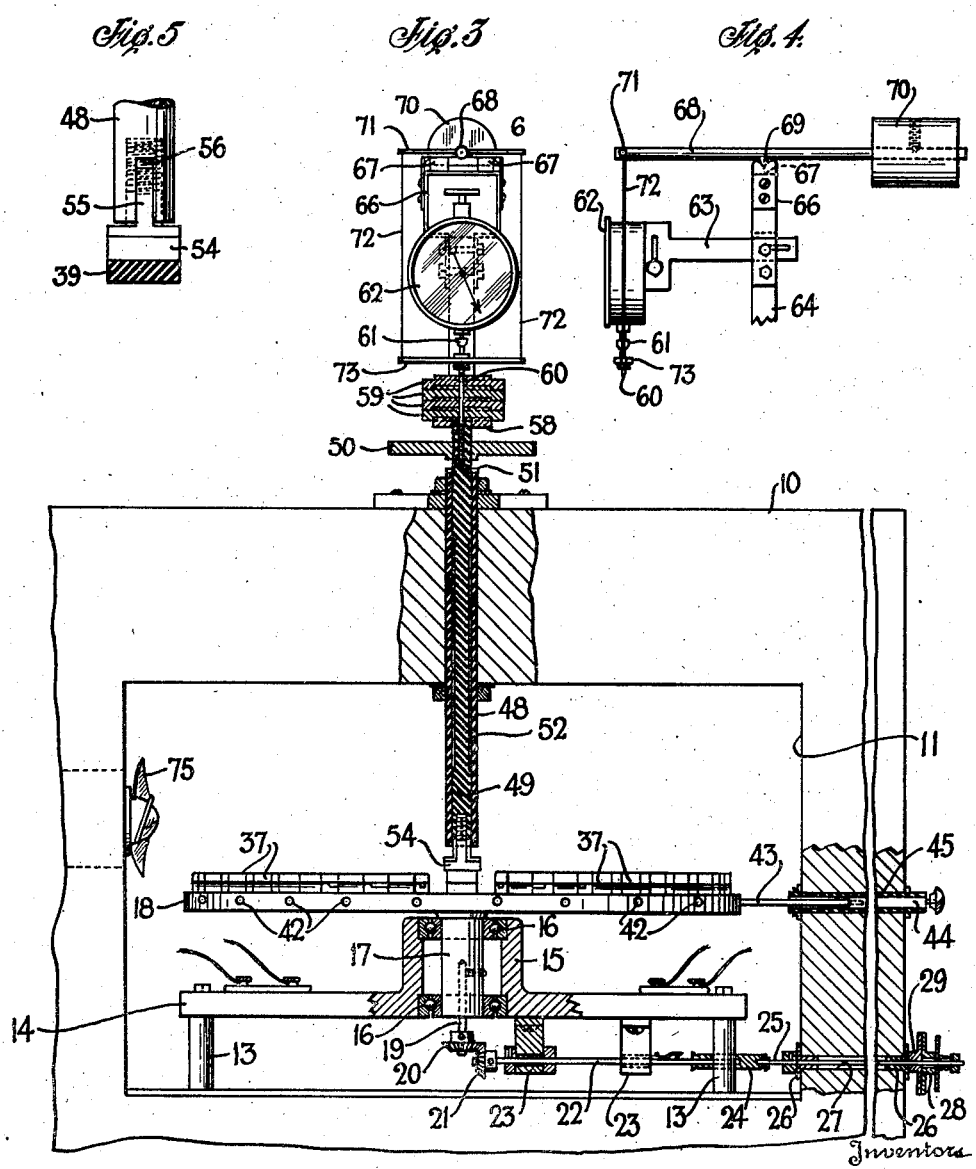

2,404,584

UNITED STATES PATENT OFFICE 2,404,584

BENDING MODULUS TEST APPARATUS

John W. Liska, Stow, and Frank S. Grover, Akron, Ohio, assignors to The Firestone Tire & Rubber Company, Akron, Ohio, a corporation of Ohio Application December 30, 1944, Serial No. 570,634

5 Claims. (Cl. 73—15.6)

This invention relates to test apparaus for determining the bending or deflection characteristics of various plastics and elastomers, including Hevea rubber and various synthetic rubber-like compositions, and more especially it relates to apparatus for obtaining such data at determinate reduced temperatures.

The invention is of especial utility to rubber technologists who seek to determine the serviceability of various elastomers for particular applications under conditions of low temperature, although the apparatus may be used for the same purpose at temperatures as high as room temperature without sacrificing all of the advantages thereof. Complete serviceability analysis of an elastomer requires the determination of both its bending and its brittleness characteristics, but the present invention relates solely to apparatus for obtaining data from which Young's modulus of elasticity may be determined.

The literautre reveals a considerable diversity in test methods employed to determine the effects of low temperatures on the physical properties of rubber and rubber-like compositions. Among those who have published papers on the subject is Koch, E. A., Rubber Chem. Tech., 14, 799 (1941); Kautschuk, 16, 151 (1940). Koch's test is one of the few in the literature in which a basic physical property of the material under test is measured. Largely because of this feature, the principles of Koch's test were adopted as the basis for the method employed in the low-temperature test that is practiced by means of the apparatus of the invention.

The chief objects of the invention are to provide improved apparatus of the character mentioned and for the purposes set forth; to provide apparatus of the character mentioned wherein a large number of test samples may be maintained at uniform temperature; to provide against transmission of heat to the interior of the apparatus by way of elements of the apparatus that necessarily extend through the wall thereof; to obviate the accumulation of frost on relatively moving parts of the apparatus; to provide work-engaging elements of such shape that indentation (penetration) into the work piece or sample is reduced to the minimum; and to provide means for adjusting the dead-weight load of the load-applying element of the apparatus. Other objects will be manifest as the description proceeds.

Of the accompanying drawings:

Fig. 1 is a perspective view of the test apparatus constituting the invention;

Fig. 2 is a fragmentary radial section of the turntable of the apparatus at the work-testing station thereof, and a test sample of the work thereon;

Fig. 3 is a fragmentary front elevation of the apparatus, parts thereof being broken away and in section;

Fig. 4 is a side elevational detail of the dial gauge of the apparatus; and

Fig. 5 is an elevational detail, on a larger scale, of the loading foot of the gauging mechanism.

Referring to the drawings, there is shown a cold cabinet or refrigerator that is designated as a whole by the numeral 10. The refrigerator per se may be of any known or preferred construction, the cold coils, the compressor, and a thermostat for regulating the temperature of the interior of the refrigerator being omitted since they constitute no part of the present invention. The refrigerator includes the usual cold chamber 11 that is accessible by means of a hinged door 12, and supported in the lower part of said chamber upon a plurality of legs 13, 13 is a base plate 14. The latter is formed with an axial bearing housing 15 that carries vertically spaced apart bearings 16, 16 that receive the axial stem or stub shaft 17 of a horizontally disposed turntable 18. The turntable is arranged to be power driven, and to this end the turntable stem 17 has a short shaft 19 mounted therein and projecting downwardly therefrom, the lower end of said shaft being provided with a bevel gear 20 that is meshed with a bevel gear 21 of the same size. The gear 21 is mounted upon a horizontal shaft 22 that is journaled in suitable bearing brackets 23, 23 that are mounted on the bottom face of base plate 14, said shaft 22 extending toward a lateral wall of the refrigerator and terminating interiorly of the chamber 11 in a coupling 24 that operatively connects it to a driving shaft 25. The latter extends through the wall of the refrigerator 10, being journaled in bearing bushings 26, 26 that are mounted in said wall at opposite ends of a bore or aperture 27 that extends through said wall, said aperture being substantially larger in diameter than said shaft 25 to provide ample clearance therebetween. Exteriorly of the refrigerator the shaft 25 has a sprocket 28 mounted thereon that has driving connection with the shaft through suitable friction mechanism 29. Trained about the sprocket 28 is a chain 30 that also is trained about a sprocket 31 on the drive shaft 32 of a speed reducing device 33, the latter being operatively connected to an electric motor 34 and both being supported upon a suitable table 35, which also may constitute a support for the refrigerator. In operation the motor 34 may be constantly driven, although the turntable 18 will be stationary while tests are being made, as presently will be described, the arrangement being possible by means of the friction connection 29 between said motor and the shaft 25. The feature of providing substantial clearance between the shaft 25 and wall of the aperture 27 enables moisture to condense therein without impeding the driving of said shaft.

Mounted upon the top of turntable 18 is a plurality of test-sample supports 37, 37, herein shown as thirty in number. Each of said supports is composed of metal and is formed at opposite ends with respective raised ribs 38 upon which a test sample 39 of rubber or other elastomer is positioned for testing. The ribs 38 are rounded so as to reduce penetration into the sample 39 during a test. The test samples are accurately formed to determinate dimensions, a size of 1 inch wide and 2.25 inches long being found satisfactory. In thickness the samples may vary from 0.10–0.40 inch as desired.

The samples 39 are tested in succession at a determinate point or station in their orbit, and means is provided for holding the turntable stationary and accurately in proper angular position for the testing of each sample. To this end the peripheral face of the turntable is formed with a plurality of recesses 42, 42 that are determinately positioned with relation to the supports 37, and selectively receivable in said recesses is a detent 43. The latter is a sectional structure that extends through the wall of the refrigerator 10 so as to be capable of manipulation from the exterior thereof. The end portion of the detent 43 that is disposed within the interior of the refrigerator is composed of metal, the remainder 44 thereof being composed of "Bakelite" (a phenol-formaldehyde resin). The detent is slidably mounted for longitudinal movement in a sleeve 45 that is mounted in the refrigerator wall, said sleeve being composed of Bakelite, which is preferred because of its low thermal conductivity. The diameter of the metal detent 43 is substantially smaller than the inside diameter of sleeve 45 to provide space in which moisture, which may seep in from the outside, may condense. The detent is pulled outwardly when it is desired to index the turntable through an angle that corresponds to the spacing between adjacent sample supports 37, the motor 34 driving the turntable when the detent is withdrawn.

In the testing of the samples 39, after they have been conditioned for a sufficient length of time to reach the temperature desired, a determinate static weight is imposed upon the sample, midway between the ribs 38 that support it, for a determinate interval of time, the resulting deflection of the sample then being noted by means of a gauge. To this end an elongate bearing sleeve 48 of Bakelite is mounted on a vertical axis through the top of the refrigerator 10, directly above the orbit of the samples 39 where said orbit is nearest the front of the refrigerator, the axis of said sleeve being directly over a test sample when the turntable is at rest by reason of the engagement of detent 43 with one of the recesses 42 of the turntable. Slidably mounted for longitudinal movement in sleeve 48 is a loading rod 49 that is exteriorly threaded at its upper end portion, there being a handwheel 50 mounted on said threaded portion. There is a metal washer 51 positioned upon the upper end of sleeve 48, the arrangement being such that the handwheel may be turned until it abuts said washer, whereupon further turning will lift the loading rod 49 relatively of the sleeve 48. Turning of the handwheel in the opposite direction lowers the rod 49. The rod 49 is composed of Bakelite, and has its medial portion of reduced diameter to provide a substantial space 52 between itself and sleeve 48. Any moisture that enters said space 52, from the exterior of the refrigerator, will condense and form frost somewhat below the upper end thereof. The end portions of the rod 49 are of such size as to have sliding fit in the sleeve 48, the latter thus constituting a bearing for the rod, the bearing surfaces being spaced from the frost zone, above and below the same, so that the presence of frost will not influence the operation of the gauging mechanism.

The lower end of the rod 49 carries a loading foot 54 that is adapted to engage the test samples. As shown in Figs. 2 and 5, the loading foot has a tapered sample-engaging extremity that is of the same width as the sample, and is rounded on the same radius as the ribs 38 to reduce penetration into the sample. The upper portion of the loading foot is located within the lower end portion of the sleeve 48, and is formed with oppositely extending ribs 55 that are slidably received in respective slots 56 in the sleeve, the arrangement being such as to prevent rotation of the loading foot 54 and loading rod 49 with relation to sleeve 48.

Mounted upon the upper end of the loading rod 49 is a weight pan 58 upon which conventional weights 59 of known value may be positioned. The weight pan is axially apertured and the weights are radially slotted to accommodate a metal push rod 60 that extends upwardly from the upper end of loading rod 49, coaxially therewith. The upper end of push rod 60 operatively engages the lower end of the operating stem 61 of a dial gauge 62 that is calibrated to indicate measurements of one-thousandth of an inch. The gauge 62 is adjustably mounted upon an arm 63 that is adjustably mounted upon and projects forwardly from a standard 64 that rises vertically from the top of the refrigerator 10.

To relieve the test-samples 39 of the deadweight load of the gauging mechanism during a test, means is provided for counterbalancing most of said load. To this end a metal support 66 is mounted atop the standard 64, said support having a horizontal top upon which a pair of agate bearings 67 are mounted. A metal beam 68 is provided with a transverse knife edge 69 that rests in bearings 67 so that the beam pivots thereon. Adjustably mounted upon the rear end of beam 68 is a counterweight 70. Mounted upon the front end of the beam 68 is a yoke 71, and depending from opposite ends thereof are wires 72, 72 that are connected at their lower ends to the respective ends of a yoke 73 that is fixedly mounted upon the push rod 60. The beam 68 constitutes a lever, and by adjusting the counterweight 70 longitudinally thereof, any portion of the dead-weight load of the loading rod 49 and elements carried thereby may be compensated for.

A rotary fan 75 is located within the chamber 11 and driven by a suitable motor (not shown) located exteriorly of the chamber. The fan is employed to circulate the air within the chamber to assure uniformity of temperature in all parts thereof.

The door 12 of the refrigerator has a window 17 therein consisting of several panes of glass with airspace between adjacent panes to reduce thermal conduction therethrough. The window enables the operator to view the test, and to observe the temperature of the chamber as indicated by a thermometer 78 located therein.

Mounted upon the base plate 14 are electric heating elements 80 that are connected to a suitable source of electrical energy by conductors (not shown). The heating elements are employed when a series of tests is made at progressively increased temperatures.

In order to assure rigidity of the turntable 18 during operation, a supporting roller 82 for the turntable is mounted beneath the same at the front thereof, close to the testing station. The roller 82 is suitably journaled upon a stub shaft 83 carried by a bracket 84 that is mounted upon the base plate 14.

Operation

In the operation of the apparatus, the handwheel 50 is rotated so as to move downwardly against the upper end of sleeve 48 and thereby to lift the loading rod 49 and loading foot 54 to a somewhat elevated position. Then the various test samples 39 of selected elastomers are accurately placed upon the respective supports 37 as the turntable is slowly turned. The refrigerator door 12 is then closed, and the fan 75 and turntable driving motor 34 are set in motion. The refrigerating mechanism (not shown) is then put into operation, its thermostat being set usually at 0° C. The time required for the chamber 11 to attain the desired temperature is indefinite and immaterial. Experience has indicated that the temperature of the interior of the thickest samples 39 employed lags behind the air temperature by about 10 minutes. An additional 10 minute conditioning is given the samples to assure adequate temperature uniformity, for the observation of modulus changes resulting from a second order transition. Bending deflection vs. load observations are thus begun 20 minutes after the refrigerator air has reached a given temperature.

When making a test, the detent 43 is inserted in one of the recesses 42 in the perimeter of turntable 18 to bring the latter to rest, at which time one of the samples 39 is directly beneath the loading foot 54. Then the handwheel 50 is turned to lower the loading foot onto the center of the sample and thus to impose a deadweight load thereon. Previously the counterweight 70 has been adjusted so that the initial deadweight load is a mere 55 grams. It is not found feasible to reduce this initial load to zero, since experience indicates that a small amount of stress is necessary to overcome the slight tendency of some of the samples to warp or twist as the temperature of the chamber 11 is varied. An additional load W, such as one or more of the weights 59, is then placed on the weight pan 58. The total load (dead load plus W) is impressed on the sample for ten seconds, following which the weight W is removed. Ten seconds later the reading of the dial gauge 62 is recorded as $R_0$. Weight W is then re-applied to the weight pan and allowed to remain for fifteen seconds. At the end of this time the dial gauge again will have come to rest in the majority of cases, and the reading is recorded as $R_1$. The difference $R_1-R_0$ is taken to be the bending deflection produced by load W. It is desirable that the load W be pre-selected to give a deflection of less than 0.025 inch and more than 0.010 inch.

Because of the fifteen second interval that elapses between the time of application of the dead load and the time the amount of deflection is recorded, the Young's modulus calculated from these data represents what might be termed a "fifteen-second Young's modulus" to distinguish it from the total and the instantaneous moduli. The fifteen second interval was arbitrarily chosen in the interest of accuracy and convenience. Because of the rapid movement of the gauge needle immediately after application of the load, readings could not be obtained accurately until at least ten to fifteen seconds had elapsed. In most instances motion of the gauge needle after fifteen seconds was slow enough to enable reasonable accuracy of reading. Longer loading periods would have been unnecessarily time-consuming.

Because of the relatively light loads employed, as the result of the use of the counterweight, indentation of the loading foot and support ribs 38 in the samples is small and practically negligible. However, if highly accurate absolute values are desired, the deflection $(R_1-R_0)$ should be corrected by subtracting the contraction of the loading rod, and also the distance the loading foot and sample supports have penetrated into the sample. This can be determined in the following manner: A solid block of material (steel or Bakelite), at least 0.25 inch thick, 1.5 inches long, and 1 inch wide is placed under a second sample of the same stock of the same thickness and width. The procedure hereinbefore described is repeated. The measured deflection $R_1'-R_0'$ is the sum of the amount the loading foot has penetrated into the sample plus the amount the loading rod has contracted or bent laterally under load W. Such bending of the loading rod is determined independently by measuring the deflection produced by a given load with the loading foot resting directly on the steel block. This small correction, $\Delta$, need be determined only once for a given load and loading rod, since it is independent of any sample. The amount of penetration of the sample supports is then calculated by subtracting $\Delta$ from $R_1'-R_0'$ and dividing by 2 (since there are two supporting ribs sustained the loaded sample). The final corrected deflection is thus given by:

$$d=(R_1-R_0)-(R_1'-R_0')-\tfrac{1}{2}[(R_1'-R_0')-\Delta]$$

Young's modulus can be calculated from the above data by means of the well known beam-bending formula:

$$E=\frac{Wl^3}{4dbh^3}$$

where $E=$ Young's modulus
$W=$ load producing a deflection, $d$
$d=$ deflection (corrected) produced by load W
$l=$ distance between centerlines of sample-supporting ribs
$b=$ width of sample
$h=$ thickness of sample After the foregoing procedure has been followed for all the samples on the turntable 18, the loading foot is raised to clear the samples and the turntable is again allowed to rotate continuously. The thermostat of the refrigerator is then set to −20° C., and after this temperature is obtained the testing process is repeated. The entire procedure is repeated at −40° C. and −60° C. (temperatures decreasing), and at 5° C. intervals back to 0° (temperatures increasing). The heating elements 80 may be employed to expedite the increasing of the refrigerator temperatures. A double set of readings is thus obtained at −40°, −20° and 0° C. If a physical change resulting from crystallization is contributing to the bending modulus, the readings at these three temperatures (temperatures increasing) will not agree with the readings made as the temperatures are lowered. Because of the relatively short time required to condition and test stocks by means of the present invention, crystallization, if it occurs at all, will be negligible.

Data obtained in the manner hereinbefore set forth may be presented in the form of graphs showing the change in Young's modulus as a function of temperature.

The apparatus is relatively simple in construction, is efficient, accurate, and relatively rapid in operation; it avoids the necessity for employing relatively thick test samples requiring high initial load; and achieves the other objects set out in the foregoing statement of objects.

Modification may be resorted to without departing from the spirit of the invention or the scope thereof as defined by the appended claims.

What is claimed is:

1. In testing apparatus of the character described, the combination of a refrigerator having a cold chamber therein, a turntable therein, supports on said turntable for stock samples to be tested, drive means for said turntable extending through the refrigerator wall, a detent engageable with the turntable to hold the same stationary, said detent extending through the refrigerator wall so as to be manipulated from the exterior thereof, loading means for impressing a determinate load upon a stock sample in the refrigerator, and means for effecting and localizing condensation of moisture in air that may seep into the cold chamber along the elements that extend through the walls of the refrigerator.

2. In testing apparatus of the character described, the combination of a refrigerator having a cold chamber therein, a turntable in said chamber, supports on said turntable for stock samples to be tested, a motor exteriorly of the refrigerator, frictional driving means connecting the motor to the turntable, a manually operable detent engageable with the turntable to hold it stationary in determinate position against the force of its friction drive, and loading means operable from the exterior of the refrigerator for impressing a determinate load upon a test sample.

3. In apparatus of the character described, the combination of a refrigerator having a cold chamber therein, a support in said chamber for a test sample, a bearing sleeve extending through the refrigerator wall above said test sample, a loading rod extending through and axially slidable in said sleeve, said rod having a reduced medial portion to provide a space between itself and the sleeve wherein moisture seeping in from outside the refrigerator may condense, means for applying a determinate load to said loading rod to deflect the test sample therebeneath, and means operatively engaging the loading rod for measuring such deflection.

4. In apparatus of the character described, the combination of a refrigerator having a cold chamber therein, a support in said chamber for a test sample, a bearing sleeve extending through the refrigerator wall above said test sample, a loading rod axially slidable in said sleeve, means on said loading rod for engaging said test sample, means for effecting condensation of any moisture in air that may seep into the refrigerator between the sleeve and the loading rod before said air reaches said chamber, means exteriorly of the refrigerator for applying a determinate load to the loading rod, and means for measuring the deflection of the sample effected by said load.

5. In apparatus of the character described, the combination of a refrigerator having a cold chamber therein, a support in said chamber for a test sample, a bearing sleeve extending through the refrigerator wall above said test sample, a loading rod axially slidable in said sleeve, means on said loading rod for engaging said test sample, said sleeve and loading rod being composed of non-metallic material of low thermal conductivity to facilitate the condensation of moisture in the air that may seep into the refrigerator between the sleeve and the loading rod before said air reaches said chamber, means exteriorly of the refrigerator for applying a determinate load to the loading rod, and means for measuring the deflection of the sample induced by said load.

JOHN W. LISKA.
FRANK S. GROVER.